US009113044B2

(12) United States Patent
Ricard

(10) Patent No.: US 9,113,044 B2
(45) Date of Patent: Aug. 18, 2015

(54) SENSOR NODE

(71) Applicant: Her Majesty the Queen in Right of Canada, as Represented by the Minister of National Defence, Ottawa (CA)

(72) Inventor: Benoit Ricard, St-Augustin-de-Desmaures (CA)

(73) Assignee: Her Majesty the Queen in Right of Canada, as Represented by the Minister of National Defence, Ottawa, Ontario (CA)

( * ) Notice: Subject to any disclaimer, the term of this patent is extended or adjusted under 35 U.S.C. 154(b) by 344 days.

(21) Appl. No.: 13/677,894

(22) Filed: Nov. 15, 2012

(65) Prior Publication Data

US 2014/0132762 A1 May 15, 2014

(51) Int. Cl.
*H04N 5/18* (2006.01)
*H04N 7/18* (2006.01)
*G08B 13/19* (2006.01)

(52) U.S. Cl.
CPC . *H04N 7/18* (2013.01); *G08B 13/19* (2013.01)

(58) Field of Classification Search
USPC ......... 348/143, 142, 145, 154, 155, 166, 169, 348/180, 25, 61, 199, 202, 208.14, 208.15, 348/211.1, 211.2, 249, 298, 335, 340, 552, 348/658, 813; 340/3.1, 4.42, 4.62, 5.61, 340/5.64, 426.15, 539.22, 615, 619, 856.3, 340/995.28; 367/16, 104, 140, 173, 178; 360/59, 70, 80, 250; 73/1.22, 1.45, 73/1.56, 1.85, 514.01; 385/75, 93
See application file for complete search history.

(56) References Cited

U.S. PATENT DOCUMENTS

| 6,353,577 | B1 * | 3/2002 | Orban et al. ................... 367/43 |
| 7,343,362 | B1 | 3/2008 | Flippen, Jr. |
| 2002/0180983 | A1 * | 12/2002 | Ina et al. ....................... 356/511 |
| 2003/0201885 | A1 * | 10/2003 | Currie .......................... 340/468 |
| 2004/0148518 | A1 * | 7/2004 | Grundback et al. .......... 713/201 |
| 2011/0193677 | A1 | 8/2011 | Ho et al. |
| 2011/0310779 | A1 | 12/2011 | De Poorter et al. |

OTHER PUBLICATIONS

Arora, A. et al., "A line in the sand: a wireless sensor network for target detection, classification, and tracking", Computer Networks, Jul. 23, 2004, pp. 605-634, vol. 46, Issue 5, Elsevier North-Holland, Inc. New York, NY, USA.

Dutta, P. et al., "Design of a Wireless Sensor Network Platform for Detecting Rare, Random, and Ephemeral Events", IPSN '05 Proceedings of the 4th International Symposium on Information Processing in sensor networks, Article No. 70, IEEE Press, Piscataway, NJ, USA.

(Continued)

*Primary Examiner* — Jefferey Harold
*Assistant Examiner* — Mustafizur Rahman
(74) *Attorney, Agent, or Firm* — Brion Raffoul

(57) ABSTRACT

Systems, methods, and devices relating to a field programmable unattended surveillance, low-power sensor node which uses a passive infrared (PIR) based motion detector to trigger a linear array of photodetectors and advanced processing for target detection and classification. The sensor node is equipped with an infrared beacon that is activated once a potential target is detected. The activated infrared beacon can then be seen by an operator using a night vision device.

15 Claims, 5 Drawing Sheets

(56) References Cited

OTHER PUBLICATIONS

Kasten, Oliver and Römer, Kay, "Beyond Event Handlers: Programming Wireless Sensors with Attributed State Machines", IPSN '05 Proceedings of the 4th international symposium on Information processing in sensor networks, 2005, Article No. 7, IEEE Press, Piscataway, NJ, USA.

Aljaafreh, Ahmad and Al-Fuqaha, Ala, "Multi-Target Classification Using Acoustic Signatures in Wireless Sensor Networks: A survey", Signal Processing—An International Journal, vol. 4, Issue 4, pp. 175-200.

Wang, Xue et al, "Agent Collaborative Target Localization and Classification in Wireless Sensor Networks", Sensors, 2007, pp. 1359-1386, vol. 7.

EasySen LLC, "Multi-Modality Sensor Board for TelosB Wireless Motes", SBT80v2 Datasheet, Jan. 29, 2008.

* cited by examiner

SENSOR NODE

FIELD OF THE INVENTION

The present invention relates to sensor equipment for use in surveillance. More specifically, the present invention relates to a sensor node that uses a passive infrared based motion detector to trigger a linear array of photodetectors and advanced processing for target detection and classification.

BACKGROUND OF THE INVENTION

Cities have played a strategic role in military operation in the past. History and demographic studies show that this trend will not only persist but will become a predominant part in military operations. The population, the terrain, and the infrastructure will heavily influence these kinds of operations. Missions in urban terrain will be conducted by small squads with few commands from higher level of the hierarchy. Mission events will be fast paced and highly dynamic, requiring near real time data and information to preserve the soldier's situational awareness. To do so, soldiers will have to carry data gathering sensors with enough processing power to assist them in their mission. Sensors will have to be small and cheap enough to be left behind to provide information on the cleared sectors should the soldiers come back.

Current field technologies do not achieve the above objectives. Existing unattended ground sensors (UGS) used by armed forces worldwide, for example Falcon Watch manufactured by Harris Corp., Scorpion manufactured by Northrop Grumman, OmniSense manufactured by McQ Inc., Classic 2000 manufactured by Thales, MUGI manufactured by Seraphim, etc. provide accurate information only if they are used in specific operational situations and locations. However, in very active areas such as in urban areas, the lack of adaptive processing, networking, and "intelligence" lead to the failure of the sensor to provide usable data and potential threat warnings to the operator.

Unattended ground sensors (UGS) have been used for military surveillance since the Vietnam War. The U.S. Army used seismic and acoustic sensors to monitor the movement of enemy vehicles and personnel in remote locations of the jungles of South East Asia, most notable along the area infamously known as the Ho Chi Minh Trail. Unfortunately, the performance of these first generation UGS was compromised by the enemy's ability to "spoof" the sensors by providing misleading information for the sensors to relay.

Subsequently, improvements have been made and current systems are significantly more capable due to advances in electronics, data processing and wireless networks. Nevertheless, one main problem remains, namely the inability to provide small, cost-effective UGS devices with suitable performance to be useful in most situations. A typical off-the-shelf UGS (with one simple sensor) costs approximately $20,000. Since the range of sensors can be as short as a few meters, depending on the sensor type and target, it is not cost effective to instrument large areas (e.g. the perimeter of a large camp).

In light of the above, there is a need for solutions which mitigate if not overcome the shortcomings of the prior art.

SUMMARY OF INVENTION

The present invention provides systems, methods, and devices relating to a field programmable surveillance, low-power sensor node which uses a passive infrared (PIR) based motion detector to trigger a linear array of photodetectors and advanced processing for target detection and classification. The sensor node is equipped with an infrared beacon that is activated once a potential target is detected. The activated infrared beacon can then be seen by an operator using a night vision device.

In a first aspect, the present invention provides a sensor node for use in monitoring an area, the node comprising:
    a center optical transducer for detecting events comprising at least one object passing in front of said center optical transducer;
    a left optical transducer for detecting events comprising at least one object passing in front of said left optical transducer;
    a right optical transducer for detecting events comprising at least one object passing in front of said right optical transducer;
    at least one optical target profiler;
    at least one other non-optical transducer for detecting said events;
wherein
    a centerline of said center optical transducer is positioned at 90 degrees from a centerline of said left optical transducer and said centerline of said center optical transducer is positioned at 90 degrees from a centerline of said right optical transducer;
    the or each centerline of said at least one target profiler is parallel with a centerline of one of said optical transducers;
    said optical target profiler is activated when an event is detected by an optical transducer which has a centerline parallel with said optical target profiler.

In a second aspect, the present invention provides a method for detecting events indicating a presence of a potential target, the method comprising:
a) providing a plurality of optical transducers for detecting events, said events comprising at least one object passing in front of one of said optical transducers;
b) providing at least one optical target profiler;
c) providing an infrared beacon;
d) detecting an object passing in front of one of said optical transducers;
e) activating said at least one optical target profiler, said at least one optical target profiler to be activated being an optical target profiler directed at an area where said object is detected in step d);
f) capturing a profile of said object using said optical target profiler;
g) activating said infrared beacon when data relating to said profile has been processed.

BRIEF DESCRIPTION OF THE DRAWINGS

The embodiments of the present invention will now be described by reference to the following figures, in which identical reference numerals in different figures indicate identical elements and in which.

The figures are not to scale and some features may be exaggerated or minimized to show details of particular elements while related elements may have been eliminated to prevent obscuring novel aspects. Therefore, specific structural and functional details disclosed herein are not to be interpreted as limiting but merely as a basis for the claims and as a representative basis for teaching one skilled in the art to variously employ the present invention.

DETAILED DESCRIPTION OF THE INVENTION

The present invention relates to a sensor node which is designed specifically for target detection in surveillance applications. The sensor node is a stand-alone, self-contained, battery operated, miniature device that contains multiple transducers of different types and capabilities.

Referring to FIGS. 1 through 4, several schematic representations of different views of the device and internal components of the device according to one embodiment of the present invention is illustrated. The device 10 includes an enclosure 20 into which different transducers and analog and digital electronic circuits have been integrated. On top of the device 10, a radio frequency (RF) antenna 30 is located to assist in signal transmission and reception. The sensor node enclosure 20 is designed to be stacked to help storage and transportation. To this end, stacking tab 40A and stacking notch 40B features are provided. Stacking tab 40A is designed to cooperate with a stacking notch 40B on another sensor node. Similarly, the stacking notch 40B is designed to cooperate with a stacking tab 40A on another sensor node.

Figure 1:
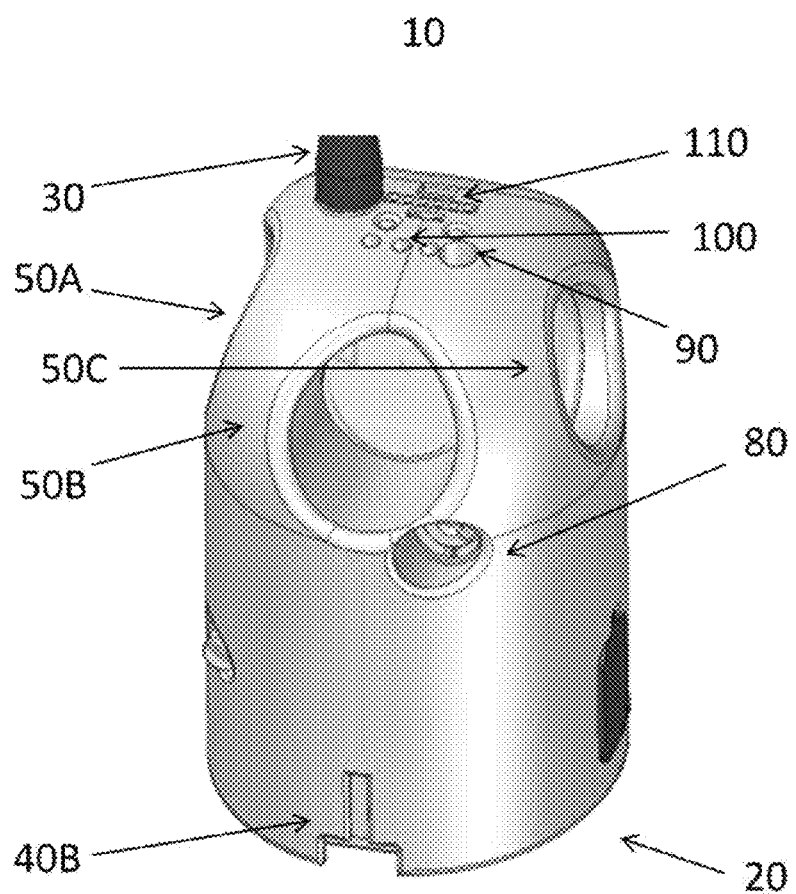
FIG. 1 is a schematic front perspective view of the device according to one embodiment of the present invention.
Figure 2:
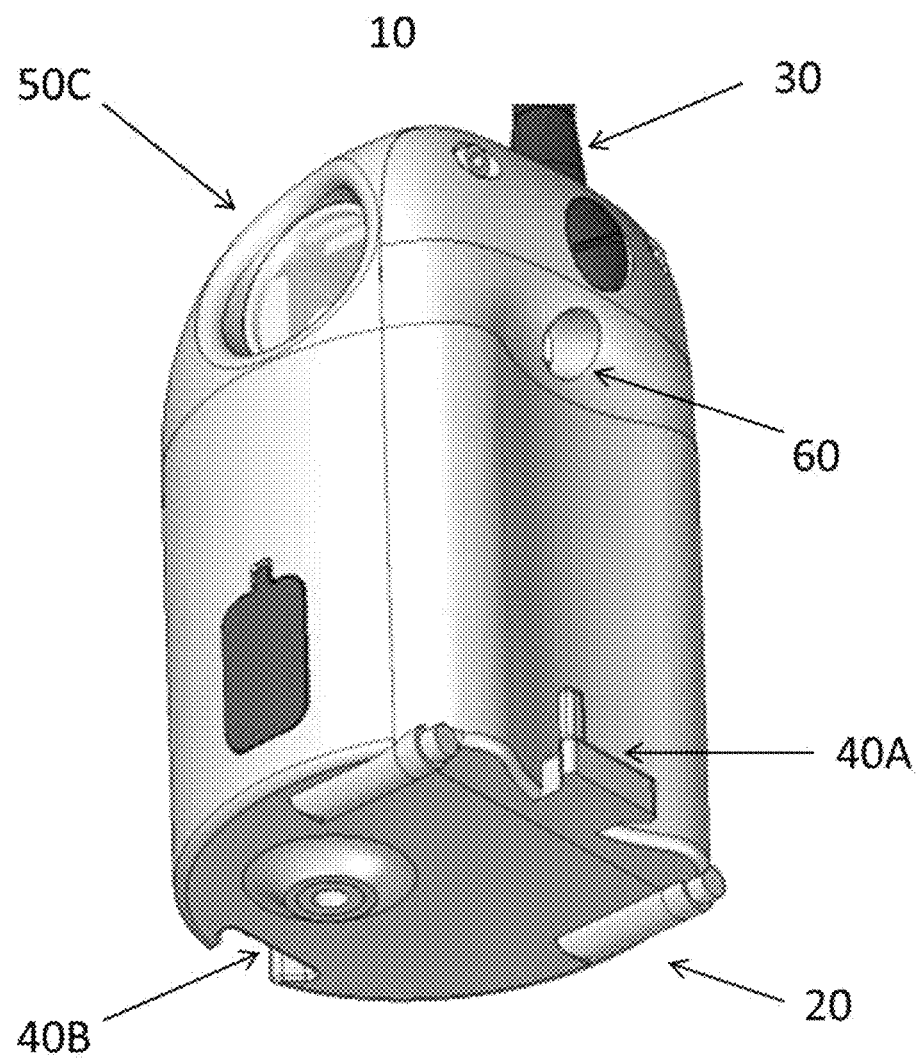
FIG. 2 is a schematic back and bottom perspective view of the device according to one embodiment of the present invention.
Figure 3:
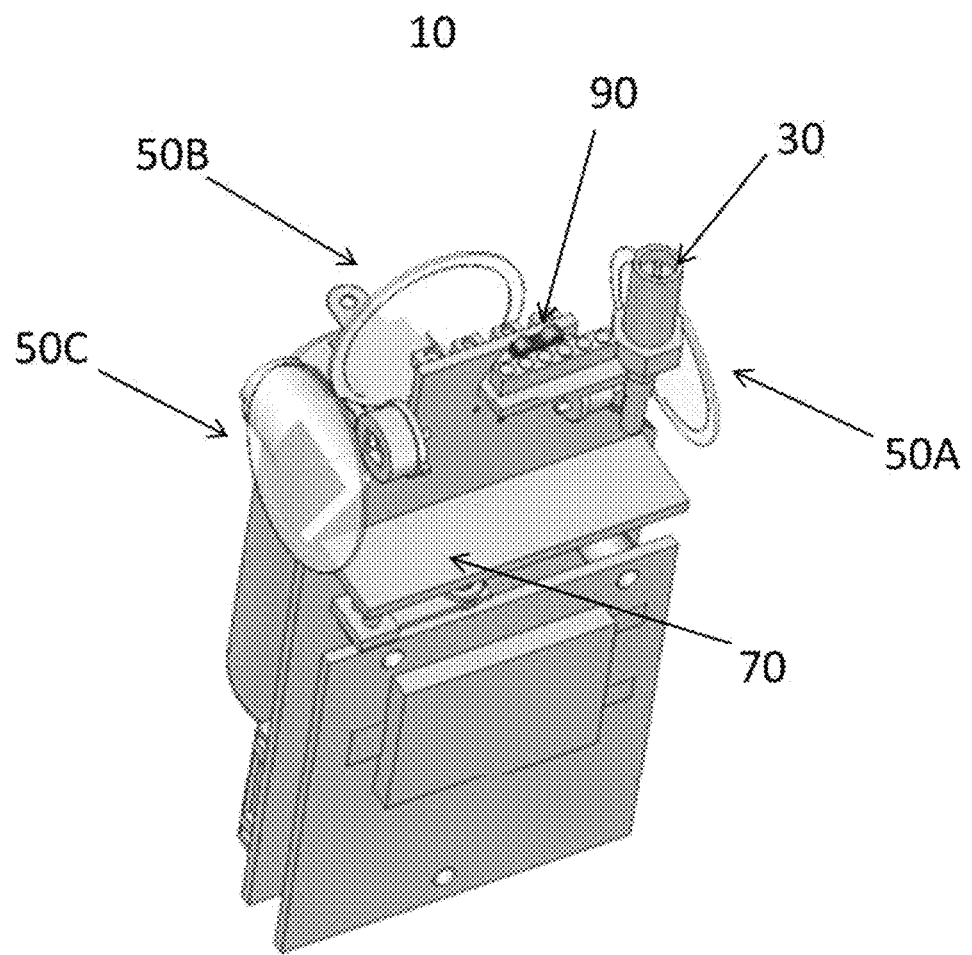
FIG. 3 is a schematic top and back perspective view of the internal components of the device as shown in FIGS. 1 and 2 according to one embodiment of the present invention.
Figure 4:
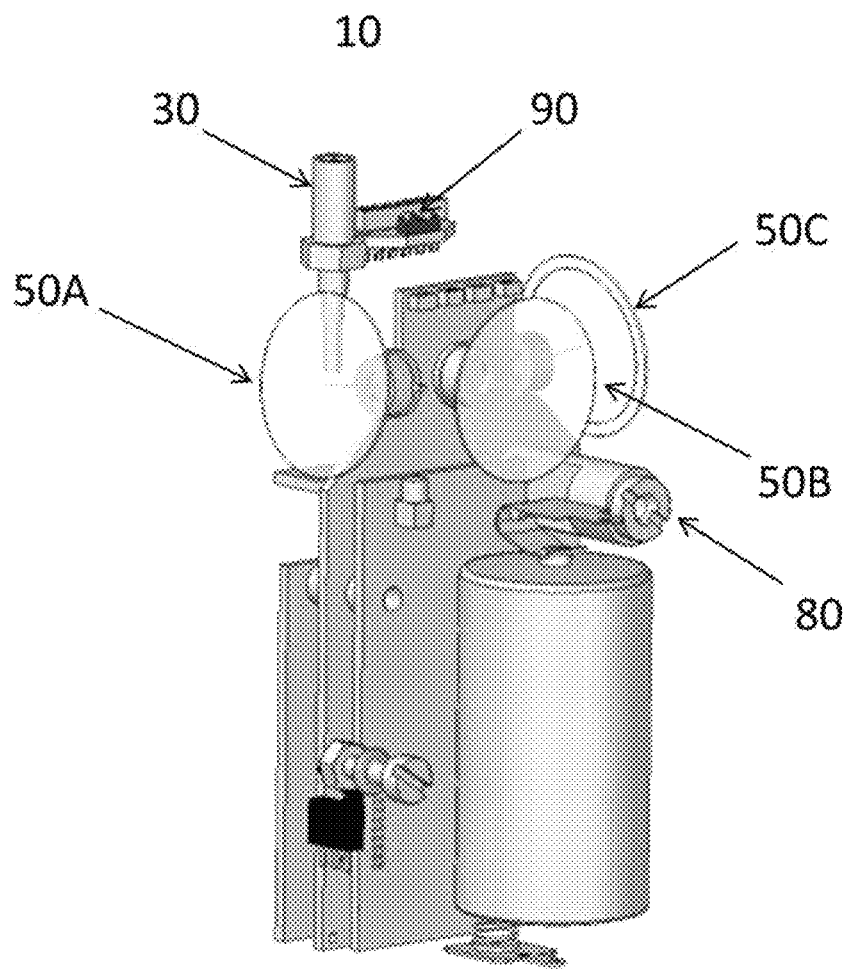
FIG. 4 is a schematic side perspective view of the internal components of the device as shown in FIGS. 1 and 2 according to one embodiment of the present invention.

The transducers on the sensor node were selected to complement each other when detecting targets and classifying such targets. All the sensor node 10 transducers are contained in the device enclosure 20. The transducers are capable of sensing many types of physical stimuli, including optical, acoustic, mechanical and magnetic stimuli. Referring to FIG. 1, a sensor set used in one embodiment of the invention is illustrated. For this embodiment, the sensor node 10 is equipped with a number of transducers, namely: optical transducers 50A, 50B, 50C, microphone 60, seismic sensor 70, magnetometer 70, accelerometer 70, and optical target profiler 80.

This embodiment of the invention uses three optical sensors, a left optical transducer 50A, a center optical transducer 50B, and a right optical transducer 50C. The centerline of the center optical transducer is at 90 degrees (approximately) to the centerlines of both the left optical transducer and the right optical transducer. This right angle configuration of the three optical sensors 50A, 50B, 50C allows for simultaneous monitoring of a main path directly across from the center sensor 50B while creating a virtual fence on each side with the left 50A and right 50C sensors.

In one implementation, the three optical sensors 50A, 50B, 50C are passive infrared (PIR) sensors, each having a 15 degree field of view with accompanying Fresnel lenses to assist light collection. In this implementation, the sensors 50A, 50B, 50C are designed for motion based detection.

The center optical transducer may be used to trigger other transducers or it may be used to trigger further functionalities of the sensor node. Since the triggering of the center optical transducer 50B means that the target is currently passing just in front of the device 10, this also means that the sensor node device 10 is facing the target. The triggering of the center optical transducer 50B can thus be used to activate the optical target profiler 80. The activation of the optical target profiler 80 initiates an image capture of the target. Along with activating the optical target profiler, the triggering of the center optical transducer can also activate the electret microphone 60, the seismic sensor 70 and the seismic sensor 70.

The centerline of the optical target profiler 80 is parallel with the centerline of the center optical transducer 50B. In one implementation, the optical target profile has a vertically arranged linear array of 128 photodetectors to image multiple targets. In this implementation, the optical target profiler 80 is used to capture the profile of targets that pass into the detection range of the center optical transducer 50B. The captured profile provides visual classification and identification of targets. Once the moving target passes in front of the target profiler 80, the target is scanned at a rate of 25 Hz. At every instance a line from the target shape is extracted. Over time, this create a profile image of the detected target. The detected line data from the optical target profiler 80 is stored in a circular buffer. The circular buffer can store up to 25 recent line data sets available for processing. To reduce power, the processing of the line data is started only when target detection occurs at the center optical transducer 50B.

To preserve power, the sensor node device 10 monitors signal levels 25 times per second. However, to be able to detect very short transient events, such as footsteps, gun shots, or detonations, the microphone 60 and the seismic sensor 70 can be used directly or through an envelope detector. The envelope detector can capture the energy of short transient signals even between the above noted signal monitoring periods. The decay rate of the envelope detector is 0.1 second, therefore at least 2 samples of an event can be measured at a sampling rate of 25 Hz.

It should be noted that the envelope detector is a known electronic circuit that uses a diode to send a positive polarity voltage into a resistor/capacitor (RC) circuit. The resistor and capacitor value are tuned to provide a voltage decay rate long enough to measure the amplitude of a fast signal.

To further assist in target detection, a magnetometer 70 can also be used. The magnetometer 70 illustrated in the Figures can function in two operational modes, direct current (DC) coupling or alternating current (AC) coupling. When used in the DC coupling mode, the magnetometer 70 functions as a compass to determine the viewing direction of the device 10. When used in the AC coupling mode, the magnetometer 70 is capable of providing readings of very small variations of the magnetic field. The AC coupling mode of the magnetometer 70 is capable of detecting magnetic perturbations, such as when a target with metallic parts is passing nearby.

The detected signals from the transducers may be used for surveillance. When signal levels on each transducer are near background level, the sensor node device 10 is in sleep mode. However, when at least one of the transducer signal levels is raised above a predetermined and user configurable threshold, the sensor node 10 starts to monitor signals for eventual target detection. This functionality reduces the required power level, and simultaneously increases the device's operational life.

The sensor node device 10 is further equipped with an infrared (IR) beacon 90. The IR beacon 90 can be activated by a network command or once a potential target is detected. This feature is used to attract the attention of an operator. The IR beacon 90 can only be seen through an image intensifier, such as night vision goggles. In one implementation, the IR beacon is activated whenever there is a target that is passing in the vicinity of the sensor node.

The sensor node device 10 can have additional indicators apart from the infrared beacon 90. Indicators such as a buzzer (not shown), status LEDs 100, and communication ports 110 are possible. These indicators can be used to indicate data or device status to an operator. The indicators can be activated by a network command or in response to target detection.

It should be noted that, once deployed, the sensor node is stationary. The 3-axis accelerometer may be used to measure the inclination of the sensor node, thereby providing tilt and roll (aiming direction) of the optical devices. The accelerometer may also be used as a tampering detector—if there is any change in sensor node tilt after deployment, then this may evidence an attempt at tampering.

Figure 5:
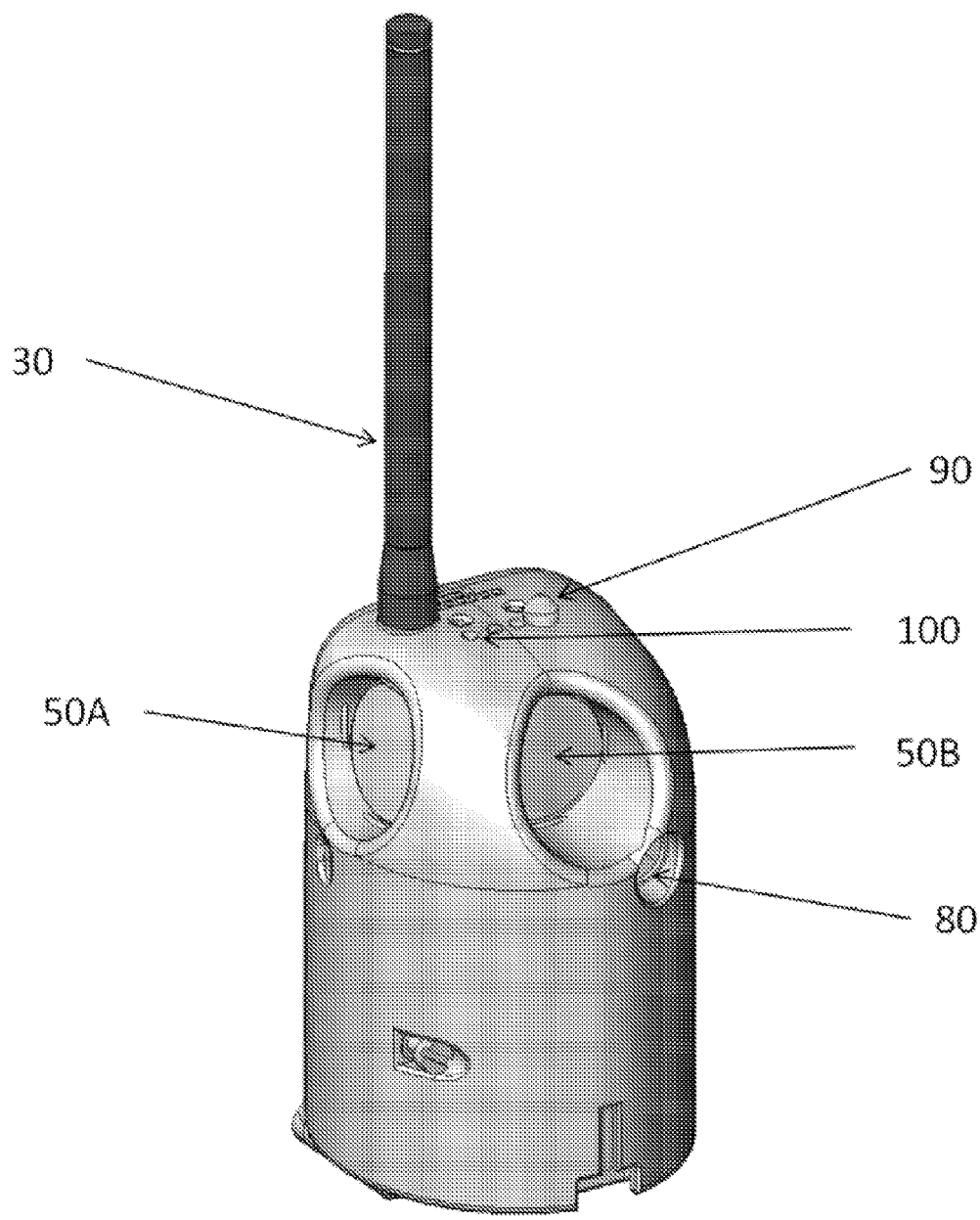
FIG. 5 is an image illustrating one implementation of the present invention.

Referring to FIG. 5, an image illustrating one implementation of the present invention is shown. As can be seen from the image, the device is a wireless stand-alone, self-contained, miniature unattended ground sensor node that may be used for target detection and classification.

It should be noted that the sensor node may be equipped with a communications module which allows for communications with other sensor nodes, base nodes, or other devices. Communications with these other nodes or devices may be through wired means or by way of wireless means. The wireless means for communicating with other nodes or devices may include radio communications, wireless optical communications (e.g. line of sight optical links) as well as other wireless transmission means which may use a variety of protocols and standards. Preferably, each sensor node is capable of bidirectional communications with other nodes or devices. In one specific implementation of the sensor node, the communications module is a wireless communications module.

Multiple sensor nodes similar to the sensor node described above can be configured to work together in a local wireless network. These sensor nodes are preferably capable of bidirectional communication with neighbouring sensor nodes on the same network. The sensor node is able to both send and receive messages to/from the network and other sensor nodes. Commands and tasks from the network can be received and acted upon by the sensor nodes. Received commands and tasks can be executed immediately and such commands and tasks may indicate to the sensor node when monitoring should occur. These commands and tasks can also specify what should be monitored as well as how each sensor node will behave when a target is detected. As an example, a specific sensor node may be remotely configured to send an alert by way of the wireless communications network if a specific event occurs. This event may range from the detection of a target (e.g. the optical sensor is tripped, an audio signal with specific characteristics is detected, or the seismic meter is tripped) to a low battery level on the sensor node or to a malfunction on the sensor node.

The use of a sensor node as described above in a local wireless network allows for in-field sensor node configuration and tasking, collaborative sensing that reduces false alarm rate, and remote actuation of sensor node onboard signalling devices.

Preferably, the sensor node device relies on a software state machine that controls the behaviour and power usage of the system. The software takes care of the initialisation of the different components of the sensor node, the transducers acquisition and signal conditioning, manages tasks and events, executes signal processing and classification software and formats messages that will be sent by the communication board.

A person understanding this invention may now conceive of alternative structures and embodiments or variations of the above all of which are intended to fall within the scope of the invention as defined in the claims that follow.

What is claimed is:

1. A sensor node for use in monitoring an area, the node comprising:
   a center optical transducer for detecting events comprising at least one object passing in front of said center optical transducer;
   a left optical transducer for detecting events comprising at least one object passing in front of said left optical transducer;
   a right optical transducer for detecting events comprising at least one object passing in front of said right optical transducer;
   at least one optical target profiler;
   at least one other non-optical transducer for detecting said events;
   wherein
   a centerline of said center optical transducer is positioned at 90 degrees from a centerline of said left optical transducer and said centerline of said center optical transducer is positioned at 90 degrees from a centerline of said right optical transducer;
   the or each centerline of said at least one target profiler is parallel with a centerline of one of said optical transducers;
   said optical target profiler is activated when an event is detected by an optical transducer which has a centerline parallel with said optical target profiler.

2. The sensor node according to claim 1 wherein said at least one other non-optical transducer is at least one of: a microphone; a seismic sensor; a magnetometer; or—an accelerometer.

3. The sensor node according to claim 1 wherein at least one of said optical transducers is a passive infrared optical transducer.

4. The sensor node according to claim 3 wherein said optical target profiler comprises an array of photodetectors.

5. The sensor node according to claim 4 wherein said optical target profiler is used to extract a profile of targets passing in front of an optical transducer having a centerline parallel with the centerline of said optical target profiler.

6. The sensor node according to claim 1 wherein said sensor node further comprises at least one wireless networking module, the or each of said at least one wireless networking module being for bidirectional communications with at least one other external device.

7. The sensor node according to claim 1 wherein an enclosure for said sensor node is equipped with at least one tab for interlocking with a notch on another sensor node, said tab and said notch allowing a stacking of said sensor node with said another sensor node.

8. The sensor node according to claim 1 wherein an enclosure for said sensor node is equipped with at least one notch for interlocking with a tab on another sensor node, said tab and said notch allowing a stacking of said sensor node with said another sensor node.

9. The sensor node according to claim 1 wherein said sensor node is deployed as part of a network of sensor nodes.

10. The sensor node according to claim 1 wherein said sensor node further comprises an infrared beacon for alerting an operator when an event is detected.

11. The sensor node according to claim 10 wherein said infrared beacon is activated when an event is detection.

12. A method for detecting events indicating a presence of a potential target, the method comprising:
   a) providing a plurality of optical transducers for detecting events, said events comprising at least one object passing in front of one of said optical transducers;

b) providing at least one optical target profiler;
c) providing an infrared beacon;
d) detecting an object passing in front of one of said optical transducers;
e) activating said at least one optical target profiler, said at least one optical target profiler to be activated being an optical target profiler directed at an area where said object is detected in step d);
f) capturing a profile of said object using said optical target profiler;
g) activating said infrared beacon when data relating to said profile has been processed.

13. The method according to claim 12 wherein said plurality of optical transducers comprises: a center optical transducer; a left optical transducer; and a right optical transducer; wherein—a centerline of said center optical transducer is positioned at 90 degrees from a centerline of said left optical transducer and said centerline of said center optical transducer is positioned at 90 degrees from a centerline of said right optical transducer.

14. The method according to claim 13 wherein the or each centerline of said at least one target profiler is parallel with a centerline of one of said optical transducers.

15. The method according to claim 14 wherein said optical target profiler to be activated in step e) has a centerline which is in parallel with an optical transducer which detected said object in step d).

* * * * *